United States Patent
Welts et al.

(10) Patent No.: US 9,361,298 B2
(45) Date of Patent: Jun. 7, 2016

(54) MEDIA CONTENT MANAGEMENT

(75) Inventors: Frank Andrew Welts, San Luis Obispo, CA (US); Ben Morrelli, Palo Alto, CA (US); Gregory Montalvo, Durham, NC (US); Daniel Thomas Tapuitea-Reynolds, Charlotte, NC (US); Andreas Marc Benamou, Atascadero, CA (US)

(73) Assignee: APPLE INC., Cupertino, CA (US)

( * ) Notice: Subject to any disclaimer, the term of this patent is extended or adjusted under 35 U.S.C. 154(b) by 285 days.

(21) Appl. No.: 12/329,874

(22) Filed: Dec. 8, 2008

(65) Prior Publication Data

US 2010/0146146 A1    Jun. 10, 2010

(51) Int. Cl.
*G06F 15/173* (2006.01)
*G06F 17/30* (2006.01)

(52) U.S. Cl.
CPC ............................. *G06F 17/30017* (2013.01)

(58) Field of Classification Search
CPC .......................... G06F 11/2082; H04L 67/104
USPC ......................................................... 709/238
See application file for complete search history.

(56) References Cited

U.S. PATENT DOCUMENTS

| | | | |
|---|---|---|---|
| 6,463,445 B1 | 10/2002 | Suzuki et al. | |
| 6,795,711 B1 | 9/2004 | Sivula | |
| 6,826,597 B1 | 11/2004 | Lonnroth et al. | |
| 6,970,602 B1 | 11/2005 | Smith et al. | |
| 7,133,933 B2 | 11/2006 | Shah et al. | |
| 7,170,882 B2 * | 1/2007 | Karaoguz et al. | 370/338 |
| 7,200,680 B2 | 4/2007 | Evans et al. | |
| 7,263,548 B2 | 8/2007 | Daswani et al. | |
| 7,296,295 B2 | 11/2007 | Kellerman et al. | |
| 7,366,712 B2 | 4/2008 | He et al. | |
| 7,379,966 B2 | 5/2008 | Agnoli et al. | |
| 7,660,572 B2 * | 2/2010 | Bucher et al. | 455/405 |
| 7,720,918 B1 * | 5/2010 | Martin et al. | 709/206 |
| 2001/0012302 A1 | 8/2001 | Gaffney | |
| 2006/0161538 A1 * | 7/2006 | Kiilerich | 707/4 |
| 2006/0258289 A1 * | 11/2006 | Dua | 455/41.3 |
| 2007/0079010 A1 | 4/2007 | Heredia et al. | |
| 2007/0112880 A1 * | 5/2007 | Yang et al. | 707/201 |
| 2007/0281607 A1 * | 12/2007 | Bucher et al. | 455/3.06 |
| 2008/0052415 A1 * | 2/2008 | Kellerman et al. | 709/246 |
| 2008/0075095 A1 | 3/2008 | Suryanarayana et al. | |
| 2008/0091845 A1 | 4/2008 | Mills et al. | |
| 2008/0141303 A1 * | 6/2008 | Walker et al. | 725/39 |
| 2009/0019492 A1 * | 1/2009 | Grasset | 725/45 |
| 2009/0119322 A1 * | 5/2009 | Mills et al. | 707/101 |
| 2010/0064332 A1 * | 3/2010 | Krikorian et al. | 725/110 |
| 2010/0070608 A1 * | 3/2010 | Hosur | 709/218 |

* cited by examiner

*Primary Examiner* — Shaq Taha
(74) *Attorney, Agent, or Firm* — Allen, Dyer, Doppelt, Milbrath & Gilchrist, P.A.

(57) ABSTRACT

System, computer implemented process and computer program product for managing media content among a plurality of devices which includes the exchange of device status data among two or more devices. The exchanged device status data includes individual device capabilities and indicia of available media content stored within each of the devices. Each device determines from the exchanged device status data whether any differences exist in available media content stored among the plurality of devices and also whether any of the determined differences in media content will require transcoding to compatible data formats. Once the determinations have been completed, synchronizing and optionally transcoding of the available media content is performed based on the determinations made from the exchanged device status data. Any required transcoding may be performed either before or after media content synchronizing.

14 Claims, 6 Drawing Sheets

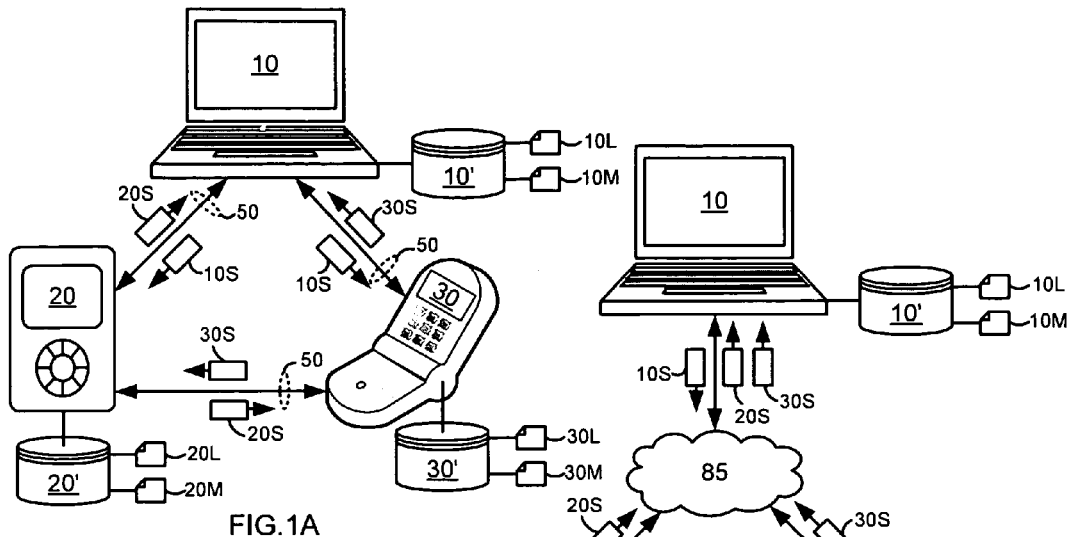
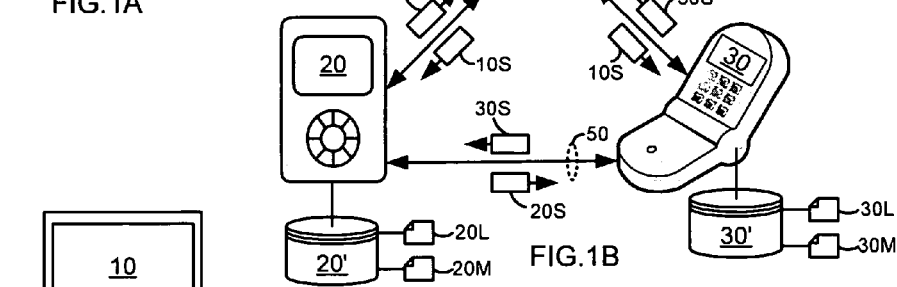
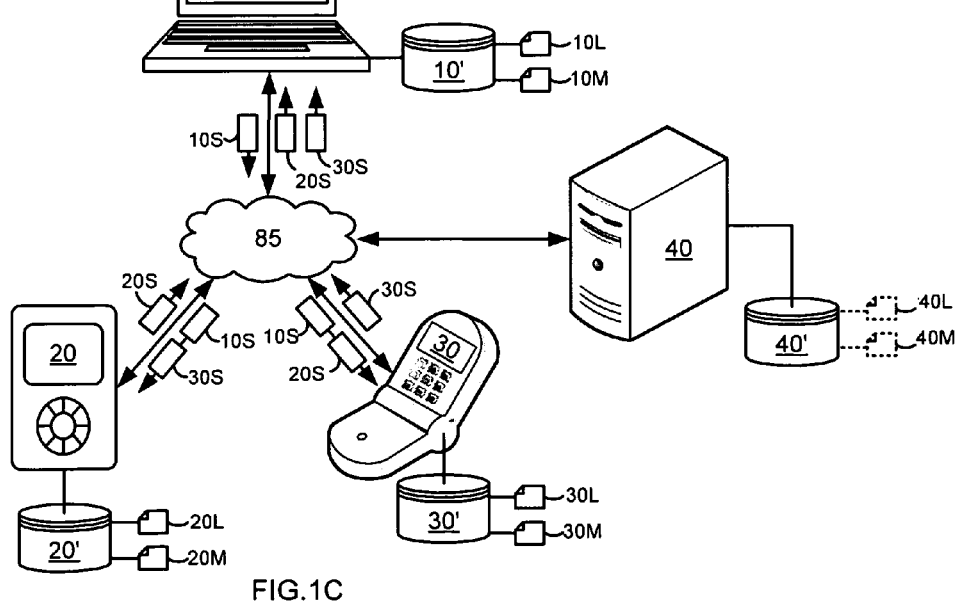
FIG.1A
FIG.1B
FIG.1C

MEDIA CONTENT MANAGEMENT

CROSS-REFERENCE TO RELATED APPLICATIONS

Not Applicable

RELEVANT TECHNICAL FIELD

The present disclosure generally relates to media content management and more specifically to synchronizing and transcoding of media content among a plurality of linked devices.

BACKGROUND

The approaches described in this section could be pursued, but are not necessarily approaches that have been previously conceived or implemented. Therefore, unless otherwise indicated herein, the approaches described in this section are not prior art to the claims in this application and are not admitted to be prior art by inclusion in this section.

Maintaining consistent media content among a plurality of computer devices typically involves separately connecting each computer device to a master computer device and manually or semi-manually deciding what media content to transfer between and among the plurality of computer devices. In another context, the master device may be a network server that is configured to actively manage media content with a client computer device, for example a desktop computer.

However, as media content is asynchronously added to each individual computer device, consistency in media content becomes increasingly difficult to maintain, frequently resulting in lost or duplicated media content, corrupted media content files and diminished satisfaction by users of these computer devices.

The corrupted media files frequently arise due to differences in file compatibilities among the various computer devices. Differences in file compatibilities further impact the user's ability to simply transfer media content between the various computer devices.

BRIEF DESCRIPTION OF THE DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

In the drawings:

FIG. 1A illustrates an ad hoc networking arrangement in accordance with an embodiment;

FIG. 1B illustrates a combination ad hoc and a conventional networking arrangement in accordance with an embodiment;

FIG. 1C illustrates an conventional networking arrangement in accordance with an embodiment;

DETAILED DESCRIPTION

Figure 2A:
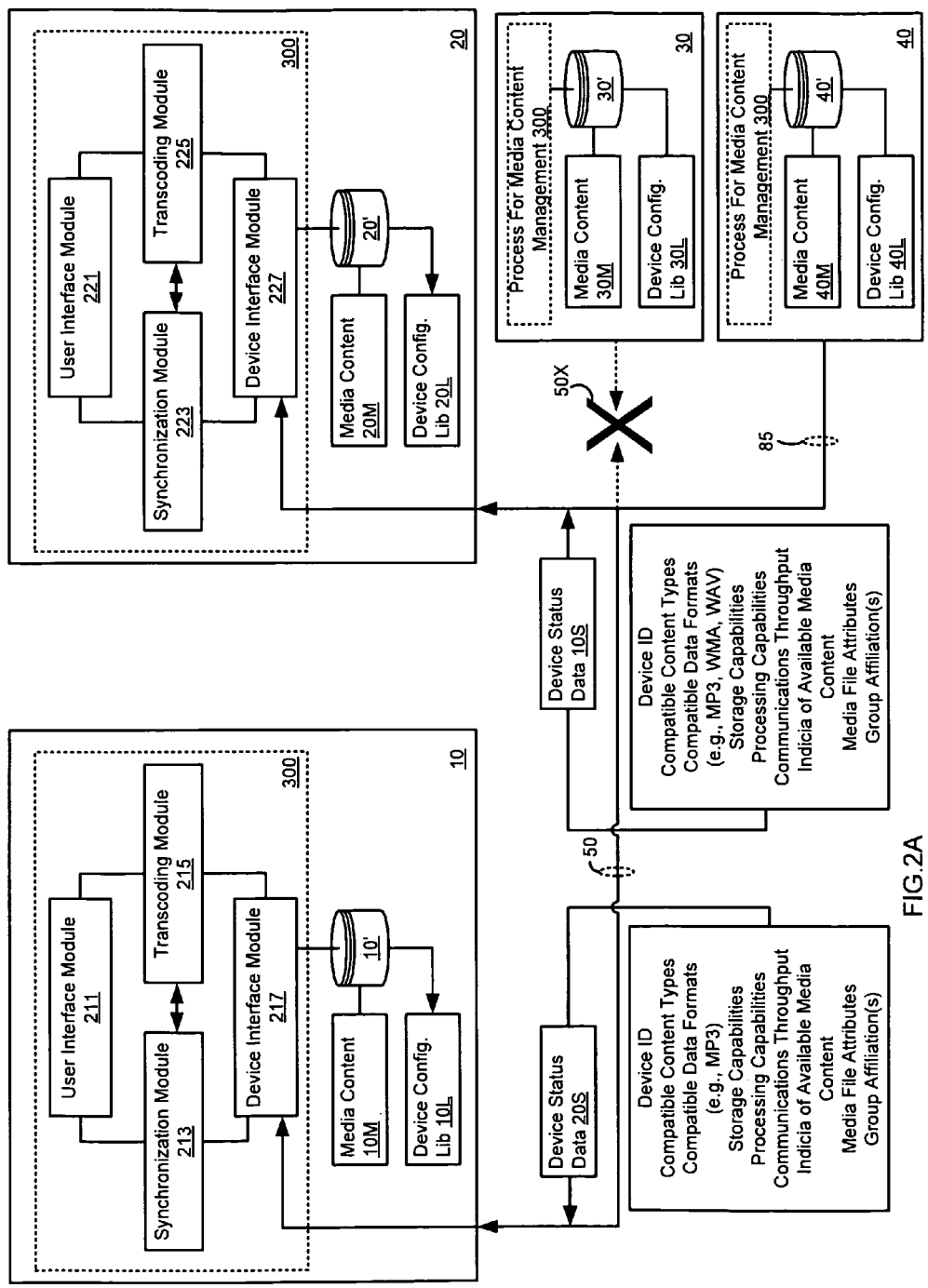
FIG. 2A illustrates an architectural arrangement for media content management in accordance with an embodiment.

A system, computer implemented process and computer program product for managing media content among a plurality of devices is described. In the following exemplary description, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Exemplary embodiments are described herein according to the following outline:
  1.0 General Overview
  2.0 Structural and Functional Overview
    2.1 Structural Overview
    2.2 Functional Overview
  3.0 Media Content Management
    3.1 Process For Managing Media Content
  4.0 Implementation Mechanisms—Hardware Overview
  5.0 Extensions and Alternatives
  1.0 General Overview A system, computer implemented process and computer program product for managing media content among a plurality of devices is described herein. In an embodiment, a computer implemented process for managing media content is provided. The computer implemented process includes the exchange of device status data among two or more devices. The exchanged device status data includes individual device capabilities and indicia of available media content stored within each of the devices.

Each device determines from the exchanged device status data whether any differences exist in available media content stored among the plurality of devices and also whether any of the determined differences in media content will require transcoding to compatible data formats. Once the determinations have been completed, synchronizing and optionally transcoding of the available media content is performed based on the determinations made from the exchanged device status data. Any required transcoding may be performed either before or after media content synchronizing. Transcoding is dependent on each individual device's file requirements, processing and/or storage capabilities.

Each device maintains a device configuration library derived from the exchanged device status data. The device configuration library includes indicia of available media content, individual device capabilities, one or more compatible data formats and group affiliation(s). In the event an affiliated group member device is absent during one or more processing communications sessions, one or more of the devices may establish a queue to push remaining unsynchronized available media content to the absent affiliated group member device(s) upon reestablishment of a processing communication session. The queue may be established locally by the device(s) containing the unsynchronized available media content to be pushed to the absent affiliated group member device(s) and/or may be established with a remote networked device and/or another affiliated group member device. Transcoding of the media content pushed to the queue may be accomplished either before queue storage or by the receiving device.

In a systemic embodiment, each device is in processing communications with one or more other devices and includes executable instructions to at least perform the above described computer implemented process. In a computer program product embodiment, the above-described executable instructions are stored on or in tangible computer readable media.

2.0 Structural and Functional Overview 2.1 Structural Overview

Referring to FIG. 1A, an ad hoc networking arrangement in accordance with an embodiment is depicted. In this embodiment, a first device 10 (laptop) is in processing communications over a communications link 50 with a second device 20 (multi-media player) and with a third device 30 (cellular telephone). Each of devices 10, 20, 30 includes datastores 10', 20', 30' for storing of media content 10M, 20M, 30M and device configuration libraries 10L, 20L, 30L. Each device configuration library 10L, 20L, 30L includes information about its affiliated group member device for which exchange of available media content is permitted.

Figure 4:
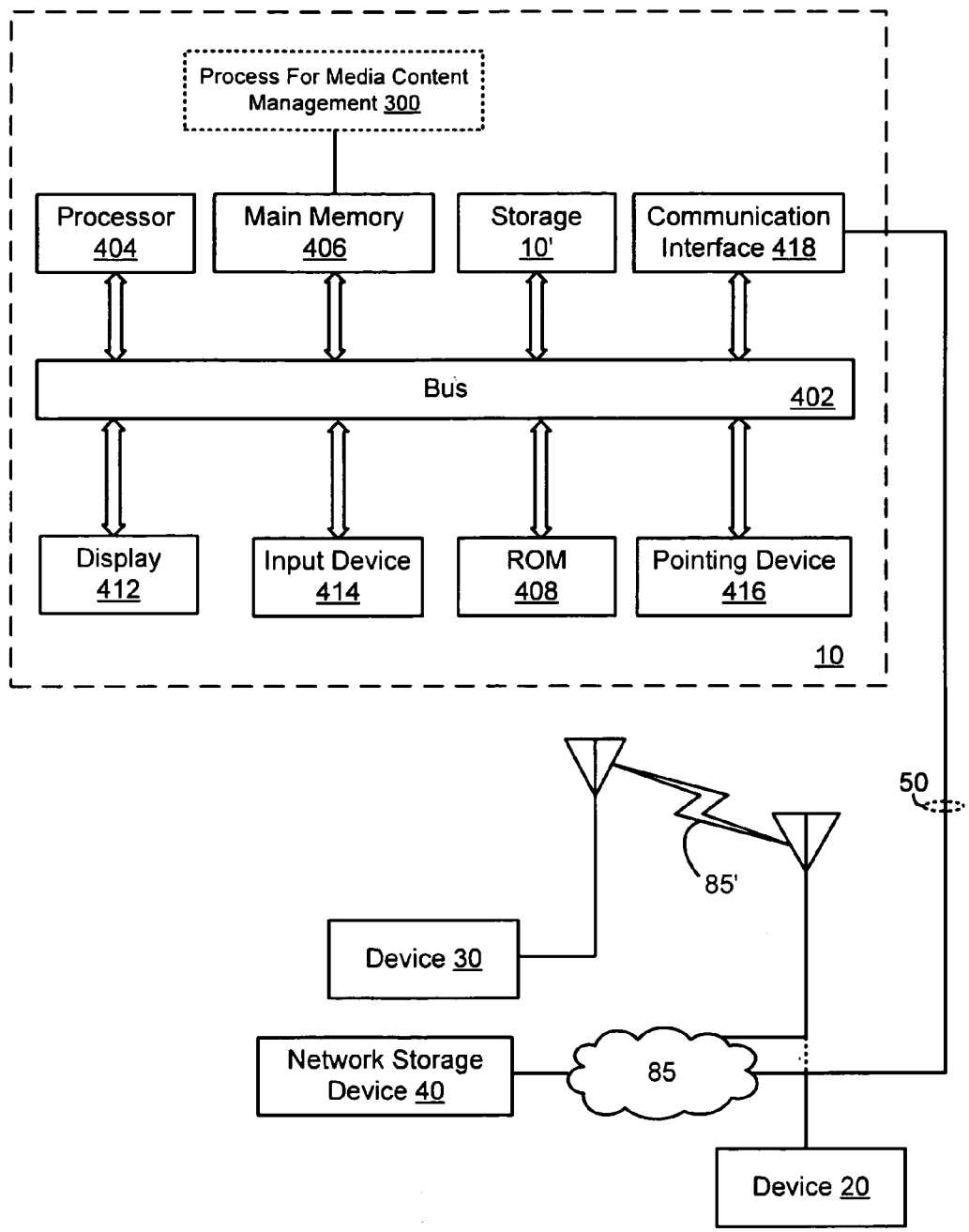
FIG. 4 illustrates an exemplary computer device upon in which the various embodiments may be implemented.

As is apparent, each device 10, 20, 30 is a type of intelligent computer device which includes a processor, memory, an operating system or operating environment and other components and functions as provided in the description accompanying the discussion for FIG. 4.

Each device 10, 20, 30 is configured with programmatic instructions operatively loaded into its memory for execution by each device's processor, a process for media content management 300 (FIG. 3) as described in any of the discussions accompanying FIGS. 2A, 2B, 2C and 3.

Media content 10M, 20M, 30M may be music, video, multimedia, documents, or data files encoded in any common format including but not limited to such exemplary file formats having extensions of *.MP3, *.MP4, *.AVI, *.WAV, *.MPG, *, *.QT, *.M4V, *.M4A, *.M4B, *.M4P, *.AST, *.WMA, *.AIF, *.AU, *.RAM, *.RA, *.MOV, *.MIDI, *.DOC, *.XLS, *.PPT, *.BMP, *.IMG, *.GIF, *.AAS, *.JPEG, *.JPG, *.PNG, *.TIF, *.TIFF, *.WPF, etc. which are compatible with the particular device, the device's operating system/operating environment and/or applications installed on each device 10, 20, 30.

Communications link 50 in which the devices 10, 20, 30 are in processing communications is a peer-to-peer network using an ad hoc networking protocol.

2.2 Functional Overview

In an embodiment, when a device connects with another device, each device exchanges device status data 10S, 20S, 30S. Device status data 10S, 20S, 30S provides information about the individual device's capabilities in terms of processing and data storage, indicia of available media content, compatible file formats, allowed media content types and group affiliations. Information obtained from the exchanged device status data 10S, 20S, 30S is used by process for media content management 300 (FIG. 3) to build rules about affiliated group member devices which are maintained in each device's device configuration libraries 10L, 20L, 30L. In an embodiment, device status data 10S, 20S, 30S may be configured as a cookie, digital certificate, digital ticket, ASCII string, object or XML file.

In an embodiment, each device 10, 20, 30 is established as an affiliated group member device prior to synchronization of available media content. Group affiliations are established by user(s) of each device and are used to prevent unauthorized devices from exchanging or receiving available media content 10M, 20M, 30M with devices 10, 20, 30. As such, in order to automatically synchronize media content between any of the devices, each device must be previously assigned to an affiliated group. Alternatively, a user may manually allow an unassigned device to join an affiliated group. Once a device is assigned to an existing affiliated group, media content synchronizations may then be conducted with the newly added device.

Referring to FIG. 1B, a combination of ad hoc and conventional networking arrangement in accordance with an embodiment is depicted. In this embodiment, device 10 (laptop) is in processing communications with second device 20 (media player) and with third device (cellular telephone) 30 over a network 85, while second device 20 (Media Player) and third device (cellular telephone) 30 are in processing communications with each other over communications link 50 (ad hoc network connection.) Network 85 may be either a local area network (LAN) and/or a wide area network (WAN). In this systematic embodiment, the functionality is essentially the same as described in the discussion accompanying FIG. 1A with the addition of routing device status data 10S, 20S, 30S over network 85 to/from device 10. In an embodiment, addressing for networked device 10 is performed using universal naming conventions (UNC) in conjunction with TCP/IP protocols by devices 20, 30. Alternate addressing mechanisms, for example, user dataform protocol (UDP) may be used as well in networked embodiments. Other than data routing and network management functions, processing communications between and among devices 10, 20, 30 is conducted as peer-to-peer. Peer-to-peer processing communications may include security provisions, such as secure tunneling, virtual private networking (VPN), secure socket layer (SSL) encrypted communications or secure shell encrypted communications (SSH).

Referring to FIG. 1C, a conventional networking arrangement in accordance with an embodiment is depicted. In this embodiment, device 10 (laptop) is in processing communications with second device 20 (Media Player) and with third device (cellular telephone) 30 over network 85. This embodiment is essentially the same as described in the discussion accompanying FIGS. 1A, 1B with the addition of routing of all device status data 10S, 20S, 30S over network 85 among and between devices 10, 20, 30.

In networked embodiments, a network storage device 40 may be connected to network 85. Network storage device 40 includes a datastore 40'. Datastore 40' is used as a temporary storage area for media content 40M. Datastore 40' may optionally maintain a device configuration library 40L for each of affiliated group devices 10, 20, 30. Network storage device 40 is primarily used as an interim storage location for media content which has been queued for future downloading to an affiliated group member device which was absent (e.g., offline) during one or more processing communications sessions. A more detailed discussion of network storage device 40 is provided in the discussion accompanying FIGS. 2A, 2B below.

Referring to FIG. 2A, an architectural arrangement for media content management in accordance with an embodiment is depicted. For clarity and ease of understanding, processors, memory and other hardware components are omitted from FIGS. 2A, 2B, 2C. One skilled in the art will appreciate that devices 10, 20 include the necessary components and features for an operable computer device as described in the discussion accompanying FIG. 4.

Figure 3:
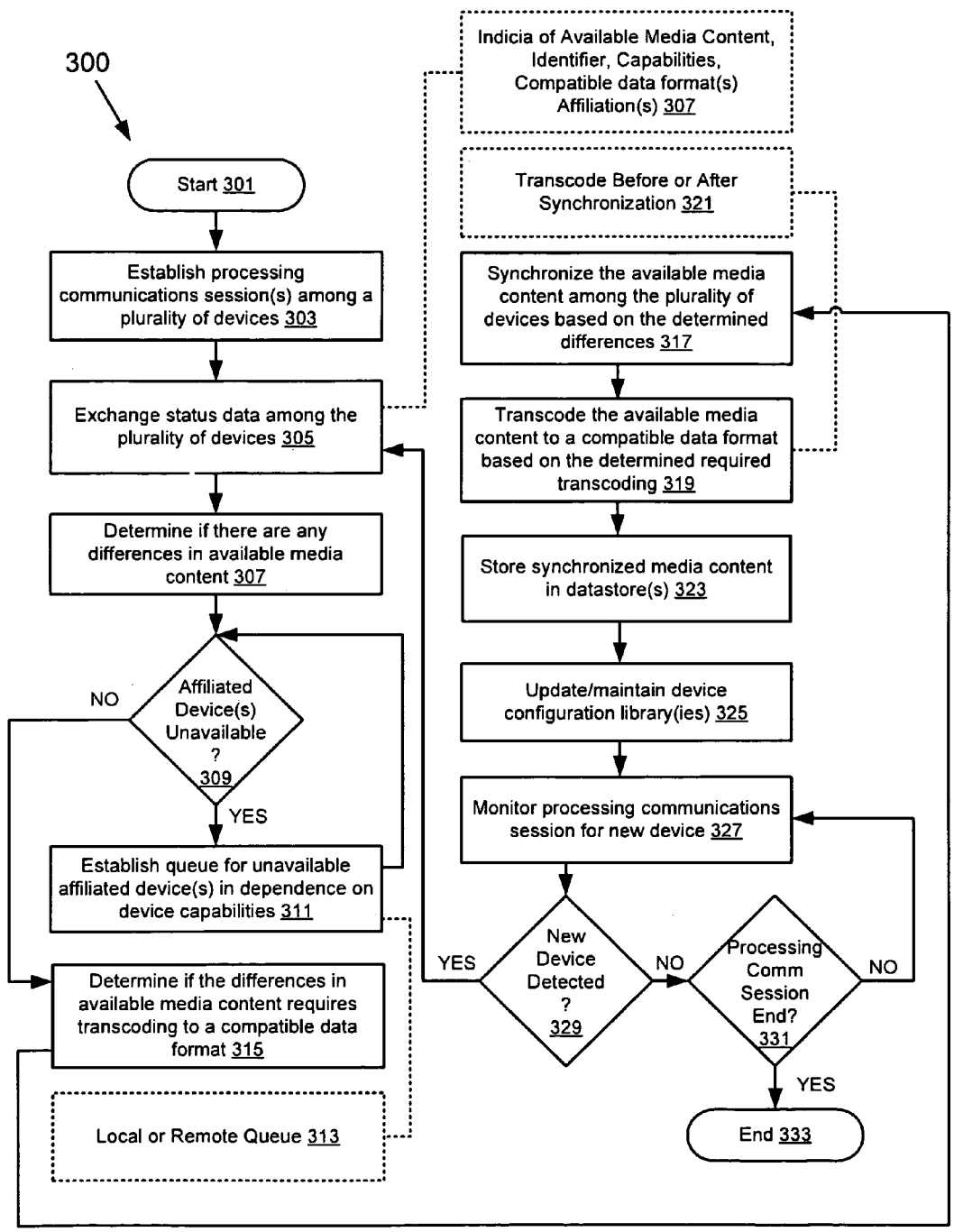
FIG. 3 illustrates a process for media content management in accordance with an embodiment.

Initially, each device 10, 20, 30, 40 is operatively loaded with process for media content management 300 (FIG. 3).

In an embodiment, network storage device 40 has a reduced functionality version of process for media content management 300 (FIG. 3) which lacks or otherwise is not operable to perform media content transcoding. Process for media content management 300 is depicted as having four separate modules for exemplary purpose only. One skilled in the art will appreciate that process for media content management 300 (FIG. 3) may include various programs, applications, applets, objects, methods, subroutines, dynamically linked libraries, services, agents, application programming interfaces, processes and/or subprocesses.

User interface modules 211, 221 are provided to allow a user to configure the operation of process for media content management 300 (FIG. 3). Synchronization modules 213, 223 are provided to synchronize available media content 10M, 20M, 30M, 40M between and among devices 10, 20, 30, 40 when in processing communications over communications link 50 and/or network 85. Transcoding modules 215, 225 are provided to convert available media content 10M, 20M, 30M, 40M into a format compatible with the devices in which available media content 10M, 20M, 30M, 40M are to be synchronized. Transcoding of available media content 10M, 20M, 30M, 40M may be performed prior to synchronization or post synchronization and is dependent on each device's processing capabilities and/or required file format requirements. Device interface modules 217, 227 are provided to interface with operating systems and/or runtime operating environments and hardware installed on devices 10, 20, 30, 40. For purposes of illustration, device 30 (cellular telephone) is shown offline 50X from communications link 50.

Datastores 10', 20', 30', 40' are provided to store media content 10M, 20M, 30M, 40M and maintain device configuration libraries 10L, 20L, 30L, 40L for each device in which process for media content management 300 is operable to synchronize and to optionally perform transcoding operations.

As briefly discussed above, a user configures process for media content management 300 (FIG. 3) by entering and/or selecting parameters via user interfaces 211, 221 which controls the operation of process for media content management 300 (FIG. 3). For example, the user may configure process for media content management 300 (FIG. 3) to perform mirroring synchronization, half-duplex synchronization or full-duplex synchronization by synchronization modules 213, 223. In half or full duplex synchronization, each device may be configured to maintain its existing media content separate from media content received from other devices. In this embodiment, media content received from other devices is maintained in a dedicated storage pool specific to the sending device(s).

For purposes of this specification, mirroring synchronization copies, renames and/or deletes preexisting media content in datastores of devices involved in mirroring synchronization.

Half duplex synchronization copies media content from a source device to one or more target devices without overwriting existing media content on the receiving target devices.

Full duplex synchronization copies media content on a source device to one or more target devices and visa versa without overwriting of existing media content on either the source or target devices.

Processing communications includes communication handshakes, device authentications, user authentications, device status data exchanges and transfers of media content between devices 10, 20, 30, 40 (FIG. 1C) over communications link 50 (FIG. 1A) or network 85 (FIG. 1C)

The user may also control transcoding functions performed by transcoding modules 215, 225 by entering and/or selecting parameters for transcoding. For example, preferred media content file format(s), compatible file formats, compatible media content types, relative estimates of processing capabilities (e.g., 1-100 scale); relative estimates of communications capabilities (networked, USB, IRDA, Bluetooth, WIFI, 3G), and indicia of available media content. Other parameters, such as username and password, group affiliations (e.g., MyPersonalCircle, MyFriendsCircle), device identifiers and available media content which is available for synchronization may also be entered and/or selected using the user interfaces 211, 221. In an embodiment, determination of communications throughput processing and/or storage capabilities are performed by separate software or firmware module(s) (not shown) and automatically recorded in device configuration libraries 10L, 20L, 30L, 40L as part of initial device configuration.

In embodiments where a network storage device 40 is not available, a user may designate an affiliated group member device as a remote storage device for queuing available media content from another affiliated device which was absent during one or more processing communications sessions. This optional configuration is particularly useful when one device has limited processing, storage and/or communications throughput capabilities. Available media content, which would normally be synchronized with an affiliated group member device, is established in a remote queue awaiting reestablishment of a processing communications session with one or more previously absent devices.

In embodiments, where network storage device 40 is available, media content may be pushed to network storage device 40 for temporary storage awaiting receipt of device status data 10S, 20S, 30S, 40S (FIG. 1A, 1B, 1C) from a device absent from one or more processing communication sessions. Once a previously absent affiliated group member device 30 establishes processing communications with at least network storage device 40, queued media content stored 40' on network storage device 40 is then pushed to the previously absent affiliated group member device 30.

In an embodiment, synchronization of available media content 10M, 20M, 30M is performed in a batch mode, where an entire device's available media content may be copied to one or more different devices and visa versa as established by user device configurations of process for media content management 300 (FIG. 3), as determined from established device rules 210, 220, 230, 240 (FIG. 2C) and/or according to user configuration settings. To prevent duplication of media content already present on a particular device, screening is performed by each receiving device using indicia of available media content contained in device status data 10S, 20S, 30S, 40S (FIG. 1A, 1B, 1C).

In an embodiment, indicia of available media content includes one or more of a universal heart-beat (timestamp) generated during the previous processing communication session, file attributes (e.g., file names, file sizes, file extensions, and/or file dates), the actual media content files and/or hashes of the available media content files. In an embodiment, individual hashes of media content files may be used as search indices for media content 10M, 20M, 30M, 40M stored in datastores 10', 20', 30' 40'. Hashing may be performed using any commonly available message digest algorithm including MD-5, SHA-1. Depending on the bit strength of the hashes created from the individual media content files, collision avoidance may be provided by concatenating the resulting hashes with the universal heart-beats.

In an embodiment, indicia of available media content are compared with existing media content stored in datastores 10', 20', 30', 40' to determine if any of the incoming media content is to be rejected by one or more receiving devices. In addition, each device may reject incoming media content if an incoming file or cumulative number of files are too large to be stored in a devices' datastore 10', 20', 30', 40' and/or is provided in an incompatible format for use by a particular device.

Continuing with the illustration of FIG. 2A, exchange of device status data 10S, 20S between devices 10, 20 causes process for media content management 300 (FIG. 3) to build device rules 220 for device 20 which are stored in a device configuration library 10L. Likewise, process for media content management 300 (FIG. 3) builds a set of device rules 210 for device 10 on device 20 based on the device status data 10 received from device 10. Again for purposes of illustration, device 10 has the capability of transcoding between WMA and MP3 file formats while device 20 is limited to MP3 file formats only. Based on indicia of available media content exchanged in the device status data 10S, 20S, device 10 determines that device 20 is not synchronized with device 10. In an embodiment, this determination may be made by comparison of universal heart-beat (timestamp) data received by device 10 from device 20 to an existing universal heart-beat (timestamp) data resident on device 10 and/or comparison of file attributes associated with the available media content.

In this embodiment, device 30 is off-line 50X and not available to participate in a processing communications session. Implementation of network storage device 40 will be discussed in conjunction with FIG. 2B which follows below.

Figure 2B:
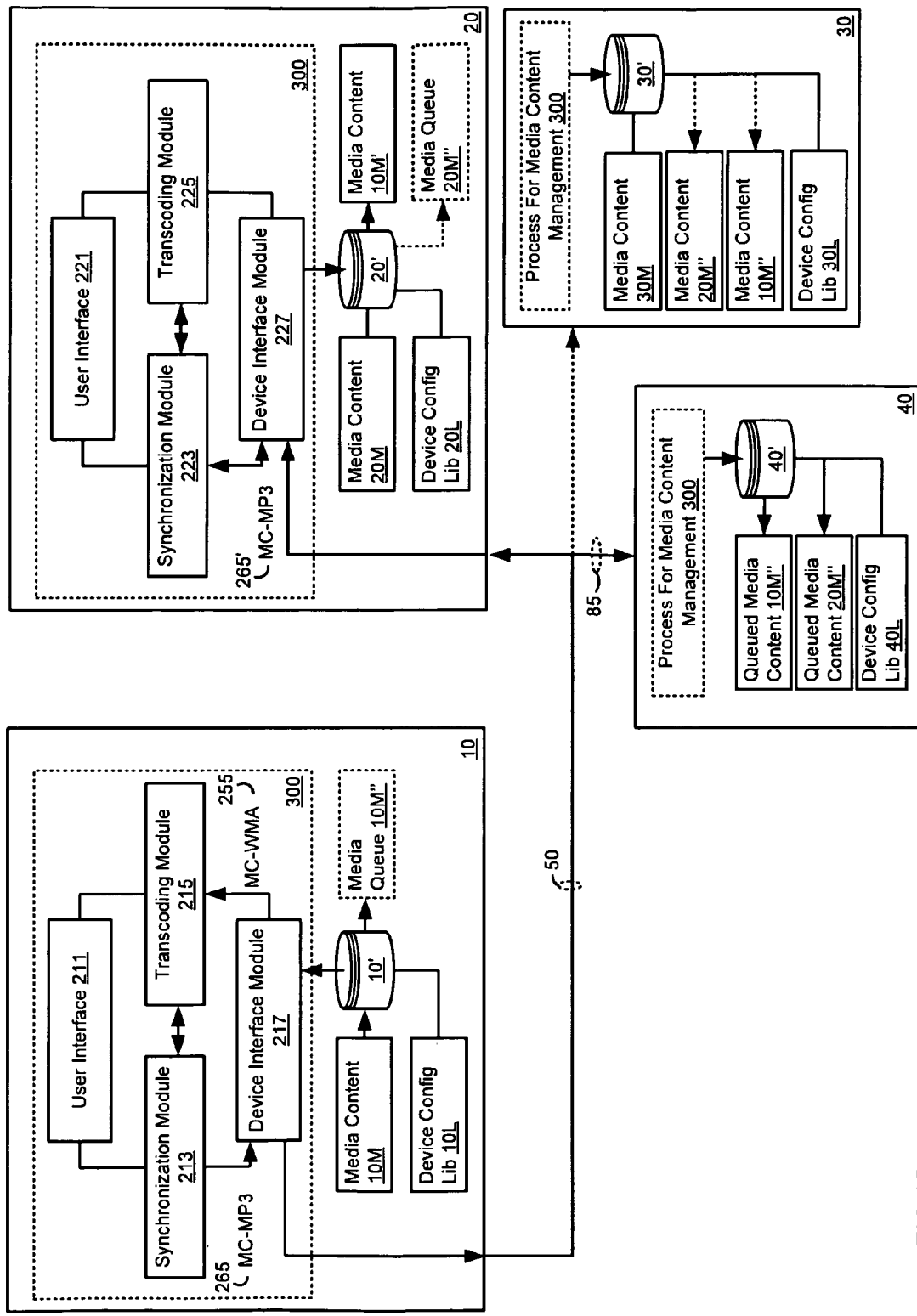
FIG. 2B illustrates an architectural arrangement for media content management in accordance with an embodiment.

Referring to FIG. 2B, an architectural arrangement for media content management in accordance with an embodiment is depicted. Continuing with the illustration discussed with respect to FIG. 2A, device 10 retrieves stored media content 10M from datastore 10', and transcodes media content MC-WMA 255 using transcoding module 215. Transcoding module 215 transcodes media content MC-WMA 255 from WMA file format to MP3 file format MC-MP3 265 which is required by Device 20. Transcoded media content MC-MP3 265 is then sent to synchronization module 213 which routes transcoded media content MC-MP3 265 to device interface module 217. Device interface module 217 sends transcoded media content MC-MP3 265 to device 20 over communications link 50.

Device interface module 227 of device 20 receives transcoded media content MC-MP3 265 and forwards transcoded media content MC-MP3 265 to synchronization module 223 for screening of duplicate media content, determination of storage capacities and/or determination of incompatible file formats for transcoding by transcoding module 225. Since transcoded media content MC-MP3 265 is already in a compatible MP3 file format, and assuming sufficient storage capacity exists, device interface module 227 stores transcoded media content MC-MP3 265 in datastore 20'. As discussed above, transcoded media content MC-MP3 265 may be consolidated with existing media content 20M (not shown) or maintained separately in a dedicated storage of media content 10M' received from device 10 in datastore 20'.

Continuing with the above illustration, since device 30, was offline during the last processing communications session, a queue may be established to push media content 10M to device 30 when device 30 establishes a processing communications session. In an embodiment, device 10 establishes a media content queue 10M" locally when device 30 reestablishes processing communications with device 10. In the event device 10 cannot support a local media queue, device 10, can establish a media queue 10M" on network storage device 40. Network storage device 40 will then push media content contained in media queue 10M" to device 30 when device 30 reestablishes processing communications with at least network storage device 40. To perform the remote queue functions, network storage device 40, is configured with a limited functionality process for media content management 300 (FIG. 3) which allows access, storage and distribution of media content while allowing user configured devices 10, 20, 30 to control what media content is allowed to be received by each device. Network storage device 40 is not normally configured to perform transcoding operations.

Analogously, if media content 20M also needs to be pushed to device 30, device 20 may establishes a media content queue 20M" either locally or on network storage device 40 which will be pushed to device 30 when device 30 reestablishes processing communications with either device 20 and/or network storage device 40. Likewise, device 30 may contribute to the overall pool of available media content 30M on devices 10, 20 by sending its media content to devices 10, 20.

Figure 2C:
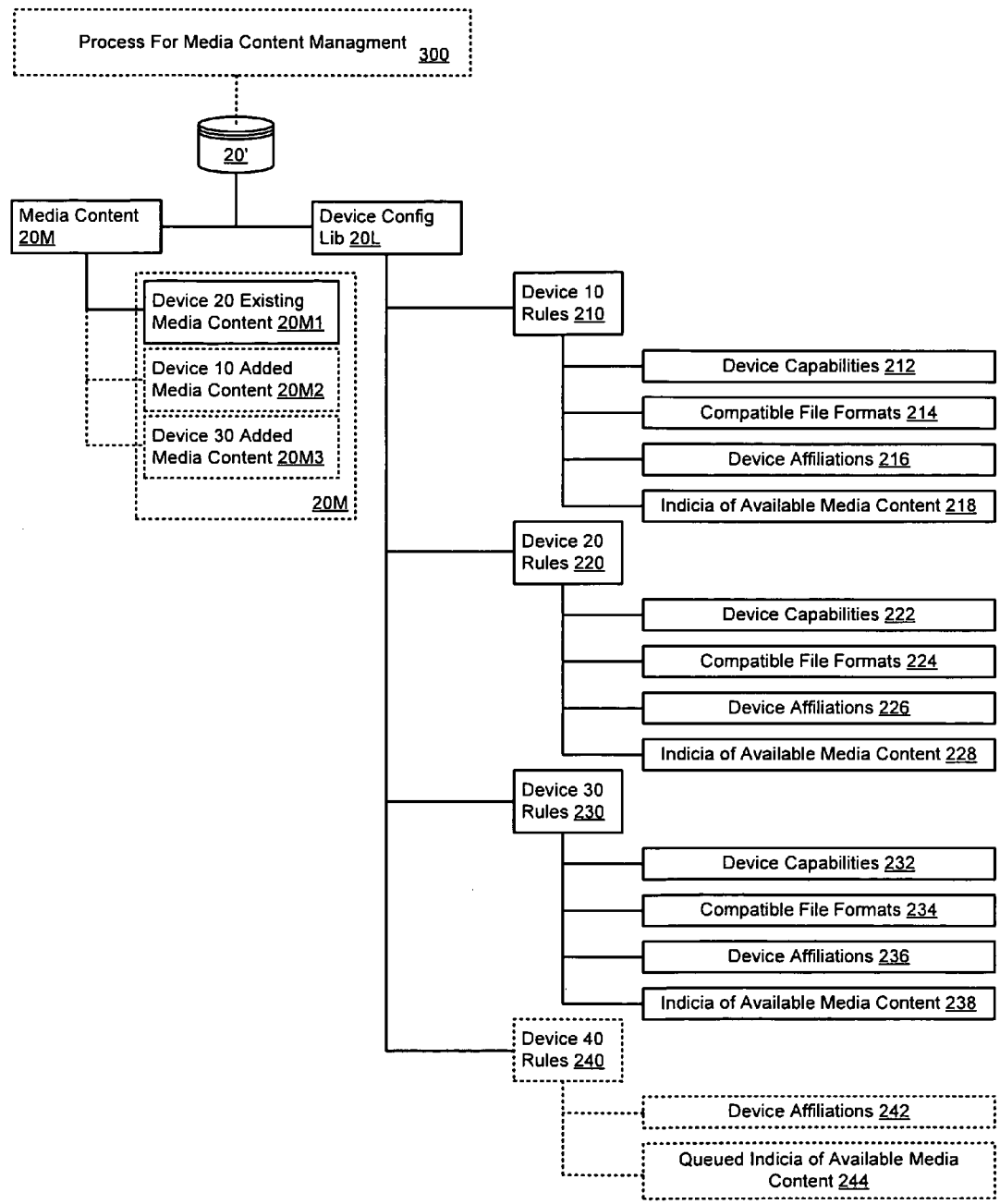
FIG. 2C illustrates a device data storage configuration is depicted in accordance with an embodiment.

Referring to FIG. 2C, a device data storage configuration is depicted in accordance with an embodiment. For illustrative purposes only, device 20 and its associated datastore 20' are depicted. One skilled in the art will appreciate that any of devices 10, 30, 40 may be similarly configured as well.

In an embodiment, process for medic content management 300 (FIG. 3) stores media content 20M in datastore 20', along with information about affiliated group member devices in device configuration library 20L. The information about affiliated group member devices includes a set of device rules 210, 220, 230, 240. Device rules 210, 220, 230, 240 includes device capabilities 212, 222, 232, 242. Device capabilities 212, 222, 232, 242 include such parameters as device processing capabilities, available memory, maximum memory, communications throughput, available communications connectivity, available communications security algorithms and device identity.

In an embodiment, device rules 210, 220, 230, 240 further include compatible file formats 214, 224, 234. Compatible file formats 214, 224, 234 includes those file formats which can be used by a particular device, maximum size of individual media content files, compatible file types based on file extensions, whether transcoding should be performed prior to synchronizing or after receipt of media content files and available file compression algorithms.

In an embodiment, device rules 210, 220, 230, 240 further include device affiliations 216, 226, 236, 242 with other affiliated group member devices. Device affiliations 216, 226, 236, 242 control which devices a particular device is permitted to exchange and/or receive media content from.

In an embodiment, device rules 210, 220, 230, 240 further include indicia of available media content 218, 228, 238. Indicia of available media content includes, a hash of each media content file, universal heartbeat (timestamp) of last synchronization, one or more indices of available media content, media content file attributes (e.g., file names, creation dates, modification dates,) media content synchronization dates, media content synchronization arrangements (i.e., half-duplex, full-duplex, mirroring, dedicated storage), existing media content 20M1 and media content 20M2, 20M3 received from other devices 10, 30.

In embodiments employing network storage devices, device rules 210, 220, 230, 240 may include indicia of available media content queued 244 to network storage device 40.

In an embodiment, device configuration library 20L may be configured as a database or lookup table accessible by process for media content management 300.

3.0 Media Content Management 3.1 Process for Media Content Management

Referring to FIG. 3, a process for media content management is depicted. Process for media content management 300 starts 301 at block 303 when a plurality of devices establish a processing communications session with one another device. The number of devices involved in processing communications is only limited by the maximum storage capacities of each device involved in processing communications. The processing communications may be performed using direct communication links, local area networks, wide area networks and any combination of these communications mechanisms. Media content synchronization and where necessary, transcoding are performed automatically (i.e., "on-the-fly") based on user configuration preferences and determined device capabilities.

At block 305, once a processing communications session has been established among the devices, each device exchanges its individual device status data among the plurality of devices involved in the processing communications session. The device status data includes but is not limited to indicia available media content, device identifier, device capabilities, compatible data formats, and affiliations as shown in block 307.

At block 307, process for media content management 300 determines if there are any differences in available media content based on the information included in the exchanged device status data.

At decision block 309, if one or more affiliated devices are unavailable or otherwise absent from processing communications, process for media content management 300 continues at block 311. At block 311, process for media content management 300 establishes a media queue 311 for unavailable affiliated member device(s). Transcoding and location of the media queue (i.e. local to a device or on a remote device 313) is determined from information contained in exchanged device status data and/or information stored in device configuration libraries.

Alternately at decision block 309, if there are no unavailable devices, process for media content management 300 continues at block 315. At block 315, process for media content management 300 determines if differences in available media content requires transcoding to a compatible data format.

At block 317, process for media content management 300 performs synchronization of available media content among the plurality of devices base on of the determined differences in media content.

At block 319, process for media content management 300 performs transcoding of the available media content to a compatible data format based on the determined required transcoding accomplished at block 315. Transcoding may be performed before or after synchronization based on the information obtained from device status data and/or device configuration library data as provided for at block 321.

At block 323, process for media content management 300 causes the synchronized media content to be stored in participating devices' datastores.

At block 325, process for media content management 300 causes each participating device in the processing communications session to update/maintain data contained in their associated device configuration libraries.

At block 327, process for media content management 300 monitors processing communications for a new device which establishes a processing communications session.

At decision block 329, if a new device is detected in a processing communication session, process for media content management 300 repeats the processing sequence beginning at block 305.

Alternately, at decision block 329, if no new device is detected in a processing communications session, process for media content management 300 continues to decision block 331.

At decision block 331, process for media content management 300 determines whether the processing communications session has ended. Processing communications may be terminated by all devices being powered down or by user(s) logging off the devices involved in the processing communications session.

At block 333, if the processing communications session has ended, process for media content management 300 ends.

Alternately at decision block 333, if processing communications session has not ended, process for media content management 300 resumes monitoring processing communications for new devices as provided for at block 327.

4.0 Implementation Mechanisms—Hardware Overview

Referring to FIG. 4, a computer device upon in which the various embodiments may be implemented is depicted. For purposes of illustration only, computer device 10 (FIG. 1A, FIG. 1B, FIG. 1C) is used to describe the various features and components generally common to all computer devices associated with the various exemplary embodiments described herein. Computer device 10 includes a bus 402 or other communication infrastructure for communicating information, and a processor 404 coupled with bus 402 for processing information. Computer device 10 also includes a main memory 406, such as a random access memory (RAM) and/or other dynamic storage device, coupled to bus 402 for storing information and instructions to be executed by processor 404. Main memory 406 may also be used for storing temporary variables or other intermediate information during execution of instructions to be executed by processor 404. Computer device 10 further includes a read only memory (ROM) 408 or other static storage device coupled to bus 402 for storing static information and instructions for processor 404. A storage device 10', such as a magnetic disk or optical disk, is provided and coupled to bus 402 for storing information and executable instructions.

Computer device 10 further includes an operating system or operating environment which may utilize any commonly encountered multitasking operating system/operating environment including but not limited to any version of Microsoft Windows, Microsoft Windows Mobile, Microsoft Windows CE, any version of Linux, Unix, Apple OS-X, Palm OS, Symbian OS, or any other multitasking operating system/operating environment.

Computer device 10 may be coupled via bus 402 to a display 412, such as a cathode ray tube (CRT) or light emitting diode display (LED), for displaying information to a computer user. An input device 414, including alphanumeric and other keys, is coupled to bus 402 for communicating information and command selections to processor 404. Input device 414 provides interrupt signals to processor 404 that may be used to interpret user interactions with device 10 and may be used in conjunction with the display 412. In an embodiment, another type of user input device (i.e., pointing device) is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. One skilled in the art will appreciate that not all devices 10, 20, 30, 40 (FIG. 1C) will have the exact cursor control or user interface shown in FIG. 4. For example, a touch screen may replace or supplement a standard mouse. Other auxiliary and peripheral devices such as a soundcard, printer, or scanner may be assumed to present where necessary to implement the various exemplary embodiments disclosed herein.

The various inventive embodiments described above are related to the use of computer device 10 for implementing the techniques described herein. According to an embodiment, those techniques are performed by computer device 10 in response to processor 404 executing one or more sequences of one or more instructions contained in main memory 406. Such instructions may be read into main memory 406 from another machine-readable medium, such as storage device 10'. Execution of the sequences of instructions for process for media content management 300 are contained in main memory 406 which causes processor 404 to execute process for media content management 300. In alternative embodiments, hard-wired circuitry may be used in place of or in combination with software instructions to implement the invention, for example, process for media content management may be encoded into a application-specific integrated circuit (ASIC). Thus, embodiments of the invention are not limited to any specific combination of hardware circuitry and software.

The term "computer readable medium" as used herein refers to any medium that participates in providing data that causes a processor to operate in a specific fashion. In an embodiment implemented using device 10, various computer readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 10'. Volatile media includes dynamic memory, such as main memory 406. Transmission media includes coaxial cables, copper wire, fiber optical cables, atmosphere and includes the electrical connections that comprise bus 402. Transmission media can also take the form of radio frequency or light waves, such as those generated during radio-wave and infra-red (IRDA) data communications. All such media must be tangible to enable the instructions carried by the media to be detected by a physical mechanism that reads the instructions into for example device 10.

Where necessary, computer programs, algorithms and routines are envisioned to be programmed in a high level language object oriented language, for example Java, C, C++, C#, CORBA, Visual Basic. Database components may utilize any common database program, by way of example and not limitation, ORACLE, Sequel Server, MySQL, SQL, MS ACCESS, DB2, MS FOXBASE, DBASE, PostgreSQL, MS EXCEL, and RBASE. Likewise, web browsers such as Microsoft Internet Explorer, Apple Safari, Google Chrome, Mozilla Firefox may be programmed using JavaScript, Python, Perl, Ruby, Scheme, Tcl, HTML, XHMTL, etc.

For purposes of this specification, the term "process" is intended to be interpreted in its broadest sense to include all instructions executable by a processor whether embodied in hardware or software. Where applicable, references to various processes may be made in both singular and plural form. No limitation is intended by such grammatical usage as one skilled in the art will appreciate that multiple programs, processes, objects, subprograms, subroutines, algorithms, applets, contexts, etc., may be implemented programmatically to implement the various inventive embodiments.

Common forms of computer-readable media include, for example, a floppy disk, a flexible disk, hard disk, magnetic tape, or any other magnetic medium, a CD-ROM, any other optical medium, punch cards, paper tape, and/or any other physical medium which can be convert from physical manifestations of executable instructions or data into computer executions data and/or data objects. In an embodiment, computer readable media includes RAM, PROM, EPROM, EEPROM, FLASH-EPROM, FLASH-RAM, USB dongle or thumb drive, application-specific integrated circuit (ASIC), and/or any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer device 10 can receive the data on the telephone line and use an infra-red transmitter to convert the data to an infra-red signal (IrDA). An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 10' either before or after execution by processor 404.

Computer device 10 also includes a communication interface 418 coupled to bus 402. Communication interface 418 provides a two-way data communication coupling to a communications link 50 that may be connected to a network 85. For example, communication interface 418 may be an integrated services digital network (ISDN) card, DSL modem, analog modem, or cellular modem to provide a data communication connection over a publicly switched telephone network (PSTN). Equivalent networking capabilities may be established using a cable modem over a cable television network. As another example, communication interface 418 may be a local area network (LAN) card to provide a data communication connection to a compatible LAN. Wireless links 85' may also be implemented. In any such implementation, communication interface 418 sends and receives electrical, electromagnetic or optical signals that carry digital data streams representing various types of information. Communication interface 418 is intended as a general purpose networking transceiver which is generally compatible with IEEE networking standards for example, 802.3 (Ethernet), 802.11 (wireless networking), 802.16, 802.22. Alternately or in combination with any general purpose networking, digital cellular communications formats compatible with for example GSM, 3G, 4G, CDMA, TDMA and evolving cellular communications standards as well as direct connections via universal serial bus (USB) port, RS-232C serial port, IEEE 1394 (Firewire), or IEEE 802.3 (Ethernet) crossover cabling arrangements.

Communications link 50 typically provides data communication through one or more networks 85 to other devices. For example, through a network 85, 85' to other devices 20, 30 or to data stored on a network storage device 40. Communications link 50 and network 85, 85' use electrical, electromagnetic and/or optical signals that carry digital data streams. The signals through the various networks 85, 85' and the signals on network link 420 and through communication interface 418, which carry the digital data to and from computer device 10, are exemplary forms of carrier waves transporting the information.

Computer device 10 can send messages and receive data, including executable code, through network(s) 85, 85', communications link 50 and communication interface 418. For example, device 30 might transmit a requested code for an application program through network 85, 85', communications link 50 and communication interface 418.

The received code may be executed by processor 404 as it is received, and/or stored in storage device 10', or other non-volatile storage for later execution. In this manner, computer device 10 may obtain application code and/or data in the form of a carrier wave and transform the information impressed on the carrier wave into stored computer readable media.

5.0 Extensions and Alternatives

In the foregoing specification, exemplary embodiments of the invention have been described with reference to numerous specific details that may vary from implementation to implementation. Thus, the sole and exclusive indicator of what is the invention, and is intended by the applicants to be the invention, is set forth in the claims that accompanying this application. Any definitions expressly set forth herein for terms contained in such claims shall govern the meaning of such terms as used in the claims. Hence, no limitation, sequence of operation, element, property, feature, advantage or attribute that is not expressly recited in a claim should limit the scope of such claim in any way. The specification and drawings are, accordingly, to be regarded in an illustrative rather than a restrictive sense.

What is claimed:

1. A computer implemented process for managing media content comprising:
    exchanging device status data among a plurality of devices that are configured to play media content;
    determining from the exchanged device status data whether any differences exist in available media content among the plurality of devices;
    synchronizing the available media content among the plurality of devices based on the determined differences;
    transcoding the available media content to a compatible data format based on a determined required transcoding;
    wherein the plurality of devices are in a peer-to-peer communications relationship with one another;
    wherein each device of the plurality of devices is configured to store a respective device configuration library derived from the exchanged device status data, the respective device configuration library for each device includes rules for each other device; and
    wherein the rules for each other device include indicia of available media content, individual device capabilities, one or more compatible data formats, and a group affiliation for each of the respective devices.

2. The computer implemented process of claim 1 wherein at least a portion of any required transcoding is performed prior to synchronizing of the available media content among the plurality of devices.

3. The computer implemented process of claim 2 wherein any transcoding performed prior to synchronizing of the available media content is dependent on the individual device capabilities.

4. The computer implemented process of claim 1 wherein at least a portion of any required transcoding is performed after synchronizing of the available media content among the plurality of devices.

5. The computer implemented process of claim 4 wherein any transcoding performed after synchronizing of the available media content is dependent on the individual device capabilities.

6. The computer implemented process of claim 1 further comprising queuing at least a portion of the available media content to a proxy device when a member of the group affiliation is not involved in the exchange of device status data.

7. A system for managing media content comprising:
    a plurality of devices in processing communications with one another;
    each of the plurality of devices configured to play media content and comprising
        a processor,
        a memory coupled to each processor, each memory including instructions which when executed by each processor causes each processor to,
        exchange device status data among the plurality of devices,
        determine from the exchanged device status data whether any differences exist in available media content among the plurality of devices,
        synchronize the available media content among the plurality of devices based on the determined differences,
        transcode the available media content to a compatible data format based on a determined required transcoding;
        store a respective device configuration library derived from the exchanged device status data;
    wherein the processing communications is a peer-to-peer communications relationship;
    wherein the respective device configuration library for each device includes rules for each other device; and
    wherein the rules for each other device include indicia of available media content, individual device capabilities, one or more compatible data formats, and a group affiliation for each of the respective devices.

8. The system of claim 7 wherein at least a portion of any required transcoding is performed prior to synchronizing of the available media content among the plurality of devices.

9. The system of claim 8 wherein any transcoding performed prior to synchronizing of the available media content is dependent on the individual device capabilities.

10. The system of claim 7 wherein at least a portion of any required transcoding is performed after synchronizing of the available media content among the plurality of devices.

11. The system of claim 10 wherein any transcoding performed after synchronizing of the available media content is dependent on the individual device capabilities.

12. The system of claim 7 wherein each memory further comprises instructions which when executed by each processor causes each processor to queue at least a portion of the available media content to a proxy device when a member of the group affiliation is not involved in the exchange of device status data.

13. A computer readable medium embodied on a non-transitory medium comprising instructions which when executed by one or more processors cause the one or more processors to:
    exchange device status data among the plurality of devices that are configured to play media content;
    determine from the exchanged device status data whether any differences exist in available media content among the plurality of devices;
    synchronize the available media content among the plurality of devices based on the determined differences;
    transcode the available media content to a compatible data format based on a determined required transcoding;
    store a respective device configuration library derived from the exchanged device status data;
    wherein the plurality of devices are in a peer-to-peer communications relationship with one another;

wherein the respective device configuration library for each device includes rules for each other device; and wherein the rules for each other device includes indicia of available media content, individual device capabilities, one or more compatible data formats, and a group affiliation for each of the respective devices.

14. The computer readable medium of claim 13 further comprising instructions which when executed by the one or more processors causes the one or more processors to queue at least a portion of the available media content to a proxy device when a member of the group affiliation is not involved in the exchange of device status data.

\* \* \* \* \*